United States Patent
Tian

(10) Patent No.: US 9,398,312 B2
(45) Date of Patent: Jul. 19, 2016

(54) ADAPTIVE INTER-CHANNEL TRANSFORM FOR WAVELET COLOR IMAGE COMPRESSION

(71) Applicant: SAMSUNG DISPLAY CO., LTD., Yongin, Gyeonggi-Do (KR)

(72) Inventor: Dihong Tian, San Jose, CA (US)

(73) Assignee: Samsung Display Co., Ltd., Yogin-si (KR)

( * ) Notice: Subject to any disclaimer, the term of this patent is extended or adjusted under 35 U.S.C. 154(b) by 0 days.

(21) Appl. No.: 14/525,084

(22) Filed: Oct. 27, 2014

(65) Prior Publication Data

US 2015/0125087 A1    May 7, 2015

Related U.S. Application Data

(60) Provisional application No. 61/899,746, filed on Nov. 4, 2013.

(51) Int. Cl.
*H04N 19/60* (2014.01)
*H04N 19/105* (2014.01)
*H04N 19/176* (2014.01)
(Continued)

(52) U.S. Cl.
CPC .............. *H04N 19/60* (2014.11); *H04N 19/105* (2014.11); *H04N 19/136* (2014.11); *H04N 19/137* (2014.11); *H04N 19/176* (2014.11); *H04N 19/186* (2014.11); *H04N 19/63* (2014.11)

(58) Field of Classification Search
CPC ............ H04N 21/2383; H04N 19/105; H04N 19/136; H04N 19/176; H04N 19/186; H04N 19/60; H04N 19/63; H04N 21/4382; H04N 21/234327; H04N 7/26351; G06K 9/6243; G06K 9/6245
See application file for complete search history.

(56) References Cited

U.S. PATENT DOCUMENTS

| | | | | |
|---|---|---|---|---|
| 4,751,742 A | * | 6/1988 | Meeker | H04N 19/60 375/240.18 |
| 5,978,514 A | * | 11/1999 | Yamaguchi | H04N 19/503 375/240.11 |

(Continued)

FOREIGN PATENT DOCUMENTS

| KR | 10-2005-0006322 A | 1/2005 |
|---|---|---|
| KR | 10-2006-0035541 A | 4/2006 |

(Continued)

OTHER PUBLICATIONS

Gibb, et al.; Wavelet Coding of Color Images Using a Spectral Transform in the Subband Domain; Mar. 2006; 9 sheets.

(Continued)

*Primary Examiner* — Jingge Wu
(74) *Attorney, Agent, or Firm* — Lewis Roca Rothgerber Christie LLP

(57) ABSTRACT

A method for compressing an image including one or more blocks, each of the one or more blocks including an x channel, a y channel, and a z channel, the method including, for each of the one or more blocks: performing a frequency domain transform, by a processor, on each of the x, y, and z channels; ordering, by the processor, the transformed x, y, and z channels into first, second, and third transformed channels; performing an inter-channel transform in accordance with the order of the first transformed channel, the second transformed channel, and the third transformed channel; and encoding the inter-channel transformed channels.

20 Claims, 10 Drawing Sheets

(51) Int. Cl.
*H04N 19/136* (2014.01)
*H04N 19/186* (2014.01)
*H04N 19/137* (2014.01)
*H04N 19/63* (2014.01)

(56) References Cited

U.S. PATENT DOCUMENTS

| | | | | |
|---|---|---|---|---|
| 6,332,030 | B1* | 12/2001 | Manjunath | G06T 1/0028 382/100 |
| 6,661,927 | B1* | 12/2003 | Suarez | H04N 19/63 375/240.11 |
| 2003/0046064 | A1* | 3/2003 | Moriya | H03M 7/30 704/201 |
| 2009/0074052 | A1* | 3/2009 | Fukuhara | H04N 19/63 375/240.01 |
| 2009/0092326 | A1* | 4/2009 | Fukuhara | H04N 19/139 382/233 |
| 2012/0051440 | A1* | 3/2012 | Parfenov | H04N 19/159 375/240.26 |
| 2014/0368610 | A1* | 12/2014 | Grangetto | H04N 13/0029 348/43 |

FOREIGN PATENT DOCUMENTS

| | | |
|---|---|---|
| KR | 10-2010-0083501 A | 7/2010 |
| KR | 10-2013-0106865 A | 9/2013 |

OTHER PUBLICATIONS

Ruedin; A Class-Conditioned Lossless Wavelet-Based Predictive Multispectral Image Compressor; IEEE Geoscience and Remote Sensing Letters, vol. 7, No. 1, Jan. 2010, pp. 166-170.

Tate; Band Ordering in Lossless Compression of Multispectral Images; IEEE Transactions on Computers, Vo. 46, No. 4, Apr. 1997, pp. 477-483.

Strobel, et al.; Reversible Wavelet and Spectral Transforms for Lossless Compression of Color Images; Signal and Image Processing Laboratory, Department of Electrical and Computer Engineering, University of California, Santa Barbara; No. 0-8186-8821-1/98 © 1998 IEEE, pp. 896-900.

European Search Report, Application Serial No. 14191608.0, dated Mar. 26, 2015, 5 sheets.

\* cited by examiner

ADAPTIVE INTER-CHANNEL TRANSFORM FOR WAVELET COLOR IMAGE COMPRESSION

CROSS-REFERENCE TO RELATED APPLICATION(S)

This application claims priority to and the benefit of U.S. Provisional Patent Application No. 61/899,746, titled "Adaptive Inter-band Transform for Wavelet Color Image Compression," and filed in the United States Patent and Trademark Office on Nov. 4, 2013, the entire disclosure of which is incorporated herein by reference.

BACKGROUND

Color bitmap images are represented as digital data at various stages within image display systems and computing systems. For example, digital images can be stored as files using file formats such as PEG, PNG, and TIFF. These image files can be unpacked and displayed on a display device (e.g., a cathode ray tube (CRT), a liquid crystal display (LCD), or an organic light emitting diode (OLED) display). Color digital images may also be transmitted between components of a system. For example, an image file may be read from memory and composed onto a video frame for display on a display device (e.g., composed with user interface elements) and the composed video frame, which itself is a color digital image, may be supplied to a display device over a link.

These various representations of digital color bitmap images can be compressed in order to reduce memory and bandwidth requirements when stored and when transmitted.

FIG. 1 is a block diagram illustrating a computing and display device 100, such as a desktop or portable computer, a smartphone, or a tablet. Such devices 100 often include or are connected to an image capture device 10. The image capture device 10 may be controlled by a processor 20. When the image capture device 10 is controlled to capture an image, the captured image data may be supplied to the processor 20 which may modify the data before storing the data in storage device 30. The storage device 30 may be, for example, NAND flash memory, dynamic random access memory (DRAM), rotating magnetic media (e.g., a hard disk drive), etc. In some embodiments the processor may be configured to control the display device 40 to display images stored on the storage device 30 or images captured by the image capture device 10. A graphical processing unit (GPU) 50 may be coupled between the processor 20 and the display device 40 using a display link. In addition, the display device 40 may include or be coupled to a data demodulation unit 42 which is configured to receive data over the display link and to convert the data into a form for display on the display device 10. Here, the display device 40 may be a liquid crystal display (LCD) device, an organic light emitting diode (OLED) display device, etc.

SUMMARY

Aspects of embodiments of the present invention relate to methods of compressing and decompressing digital color bitmap images and systems configured to perform these methods.

According to one embodiment of the present invention, a method for compressing an image including one or more blocks, each of the one or more blocks including an x channel, a y channel, and a z channel, includes, for each of the one or more blocks: performing a frequency domain transform, by a processor, on each of the x, y, and z channels; ordering, by the processor, the transformed x, y, and z channels into first, second, and third transformed channels; performing an inter-channel transform in accordance with the order of the first transformed channel, the second transformed channel, and the third transformed channel; and encoding the inter-channel transformed channels.

The ordering of the three transformed channels may include: computing an xy difference between the transformed x channel and the transformed y channel; computing an xz difference between the transformed x channel and the transformed z channel; computing a yz difference between the transformed y channel and the transformed z channel; and determining the ordering of the three transformed channels in accordance with the xy difference, the xz difference, and the yz difference.

The determining of the ordering of the three transformed channels may include: when the xy difference is less than the yz difference and the xz difference is less than the yz difference, then ordering the x channel as the first channel, the y channel as the second channel, and the z channel as the third channel, when the yz difference is less than the xy difference and the xz difference is less than the xy difference, then ordering the z channel as the first channel, the y channel as the second channel, and the x channel as the third channel, and otherwise, ordering the y channel as the first channel, the x channel as the second channel, and the z channel as the third channel.

The determining of the ordering of the three transformed channels may include: computing an x product of the xy difference and the xz difference; computing a y product of the xy difference and the yz difference; and computing a z product of the xz difference and the yz difference, and the first channel may be the channel corresponding to the smallest of the x product, the y product, and the z product.

The determining of the ordering of the three transformed channels may include: computing an x product of the xy difference and the xz difference; computing a y product of the xy difference and the yz difference; and computing a z product of the xz difference and the yz difference, wherein the x channel represents a red channel and the x product represents a red product, wherein the y channel represents a green channel and the y product represents a green product, wherein the z channel represents a blue channel and the z product represents a blue product, wherein, when the green product is greater than a green threshold, when the red product is less than the blue product and the red product multiplied by a green bias is less than the green product, the first channel is the red channel, the second channel is the green channel, and the third channel is the blue channel, when the blue product is less than the red product and the blue product multiplied by the green bias is less than the green product, the first channel is the blue channel, the second channel is the green channel, and the third channel is the red channel, and otherwise, the first channel is the green channel, the second channel is the red channel, and the third channel is the blue channel, and wherein, when the green channel is less than or equal to the green threshold, the first channel is the green channel, the second channel is the red channel, and the third channel is the blue channel.

The green bias may be at least 1.25.

The xy difference may be calculated by computing the absolute value of the difference between a zeroth coefficient of the transformed x channel and a zeroth coefficient of the transformed y channel; the xz difference may be calculated by computing the absolute value of the difference between the zeroth coefficient of the transformed x channel and a zeroth coefficient of the transformed z channel; and the yz difference may be calculated by computing the absolute value of the difference between the zeroth coefficient of the transformed y channel and the zeroth coefficient of the transformed z channel.

The x channel may represent a red color, the y channel may represent a green color, and wherein the z channel may represent a blue color.

The performing of the frequency domain transform of each of the x, y, and z channels may include performing a wavelet transform on each of the channels.

The wavelet transform may be a Haar transform.

The image may include at least two blocks, wherein the three channels are ordered in a first order in a first block of the blocks and ordered in a second order is a second block of the blocks, the first order being different from the second order.

According to one embodiment of the present invention, an image processing device includes: an image partitioning module to partition a color image into a plurality of blocks of pixels, each of the blocks including a plurality of channels, the channels including an x channel, a y channel, and a z channel; a wavelet transform module to transform the x, y, and z channels of a block of the blocks into a frequency domain; a color channel ordering module to determine an ordering of the transformed x, y, and z channels of the block into first, second, and third transformed channels; an inter-channel transform module to transform the ordered channels; and a quantization and entropy coding module to encode the inter-channel transformed channels.

The channel ordering module may be to: compute an xy difference between the transformed x channel and the transformed y channel; compute an xz difference between the transformed x channel and the transformed z channel; compute a yz difference between the transformed y channel and the transformed z channel; and determine the ordering of the three transformed channels in accordance with the xy difference, the xz difference, and the yz difference.

When the xy difference is less than the yz difference and the xz difference is less than the yz difference, then the channel ordering module may output the x channel as the first channel, the y channel as the second channel, and the z channel as the third channel, when the yz difference is less than the xy difference and the xz difference is less than the xy difference, then the channel ordering module may output the z channel as the first channel, the y channel as the second channel, and the x channel as the third channel, and otherwise, the channel ordering module may output the y channel as the first channel, the x channel as the second channel, and the z channel as the third channel.

The channel ordering module may be to: compute an x product of the xy difference and the xz difference; compute a y product of the xy difference and the yz difference; compute a z product of the xz difference and the yz difference; and the first channel may be the channel corresponding to the smallest of the x product, the y product, and the z product.

The channel ordering module may be to: compute an x product of the xy difference and the xz difference; compute a y product of the xy difference and the yz difference; and compute a z product of the xz difference and the yz difference, wherein the x channel represents a red channel and the x product represents a red product, wherein the y channel represents a green channel and the y product represents a green product, wherein the z channel represents a blue channel and the z product represents a blue product, wherein: when the green product is greater than a green threshold, when the red product is less than the blue product and the red product multiplied by a green bias is less than the green product, the channel ordering module outputs the red channel as the first channel, the green channel as the second channel, and the blue channel as the third channel, when the blue product is less than the red product and the blue product multiplied by the green bias is less than the green product, the channel ordering module outputs the blue channel as the first channel, the green channel as the second channel, and the red channel as the third channel, and otherwise, the channel ordering module outputs the green channel as the first channel, the red channel as the second channel, and the blue channel as the third channel, and when the green channel is less than or equal to the green threshold, the channel ordering module outputs the green channel as the first channel, the red channel as the second channel, and the blue channel as the third channel.

The green bias may be at least 1.25.

The channel ordering module may be to calculate the xy difference by computing the absolute value of the difference between a zeroth coefficient of the transformed x channel and a zeroth coefficient of the transformed y channel; the channel ordering module may be to calculate the xz difference by computing the absolute value of the difference between the zeroth coefficient of the transformed x channel and a zeroth coefficient of the transformed z channel; and the channel ordering module may be to calculate the yz difference by computing the absolute value of the difference between the zeroth coefficient of the transformed y channel and the zeroth coefficient of the transformed z channel.

The wavelet transform module may be to transform the x, y, and z channels of the block utilizing a Haar transform.

The color channel ordering module may be to order the channels of a first block of the blocks into a first order and may be to order the channels of a second block of the block in a second order, the first order being different from the second order.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

DETAILED DESCRIPTION

Figure 1:
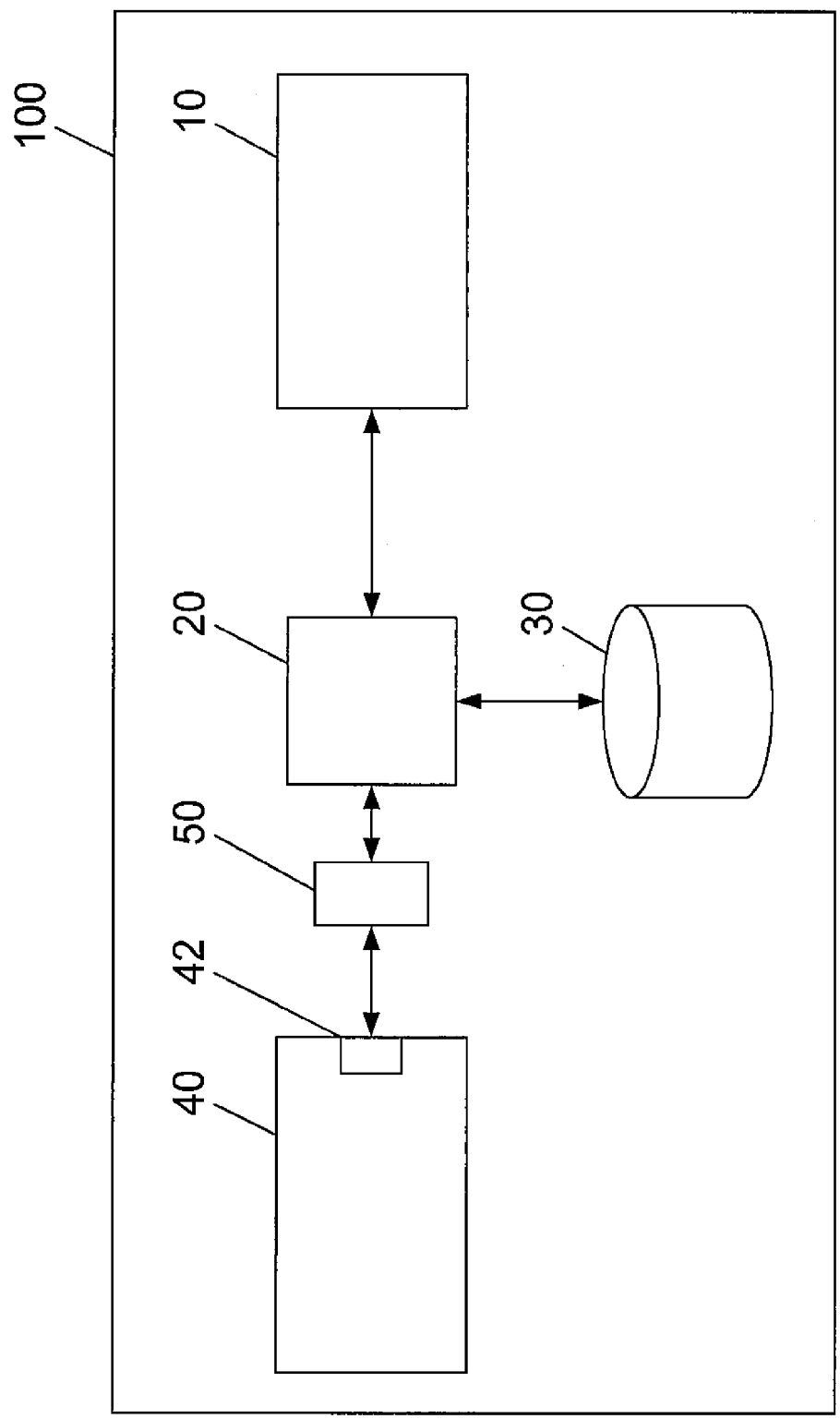
FIG. 1 is a block diagram illustrating a computing system according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification. Also, in the context of the present application, when an element is referred to as being "connected to" another element, it can be directly connected to the another element or be indirectly connected to the another element with one or more intervening elements connected therebetween.

Color bitmap images are typically represented in digital computing systems using multiple channels. For example, computer systems such as personal computers and mobile phones and the display devices connected to these computer systems, generally store, transmit, and/or receive image data represented by separate red, blue, and green channels using the RGB color model, where each of the channels represents the chromaticity of its corresponding color at each location in the image. For the sake of convenience, various embodiments of the present invention will be described below in accordance with the representation of images using red, blue, and green channels (e.g., RGB color space). However, digital computing systems may also represent images using other color models and embodiments of the present invention may also be applied to these other multi-channel representations of color image data, such as YUV and Lab.

Wavelet transforms such as the Haar wavelet transform, the Ricker wavelet transform, the Daubechies wavelet transform, and the triangular wavelet transform may be used to compress digital bitmap images. For example, a wavelet transform can be applied to a bitmap image, which transforms the image into a frequency domain and produces a plurality of coefficients representing the strengths of various frequencies of signals within the pixels of the image. These coefficients can be compressed because most of the information is concentrated in a few of those coefficients. In a color image, the wavelet transform is applied to each of the channels.

Furthermore, for color images, color space transform and/or mapping is often applied to compress the images by reducing redundancies arising from correlations among color channels. For example, in an RGB format there are high correlations between all three channels in areas of the image that are shades of gray (e.g., white to black) because the chromaticity of each of the colors (red, blue, and green) is about the same when representing shades of gray. As such, some color space transforms include RGB to YUV and, when lossless transforms are used, RGB to YCoCg. In these examples, the Y channel represents luminance while the U and V channels or the Co and Cg channels represent color components.

Another way of compressing color images includes performing an inter-band spectral transform on coefficients in the wavelet domain as described, for example, in Gibb et al. "Wavelet Coding of Color Images Using a Spectral Transform in the Subband Domain" 2006, the entire disclosure of which is incorporated herein by reference.

Embodiments of the present invention are directed to systems and methods for compressing color digital bitmap images by applying an inter-channel (or inter-band) transform for block-based wavelet image compression. In particular, embodiments of the present invention are directed to a low computational complexity, reversible inter-channel transform that is adaptive to local color intensity of each transformed block of an image.

According to one embodiment of the present invention, local adaptation is achieved by determining an ordering of the color channels for each block (e.g., on a block-by-block basis) based on DC values of the wavelet coefficients (the zeroth coefficient) in order to increase or maximize correlation between the channels. As a result, embodiments of the present invention provide compression gain for certain types (or kinds) of images (e.g., images having different levels of correlation between the channels in different portions of the image).

As discussed above, embodiments of the present invention will be described below with reference to RGB color images. However, embodiments of the present invention are not limited thereto and embodiments of the present invention may be used with other color spaces. As such, in some instances, the different channels of an image may be referred to more generically as, for example, x, y, and z channels.

Figure 2:
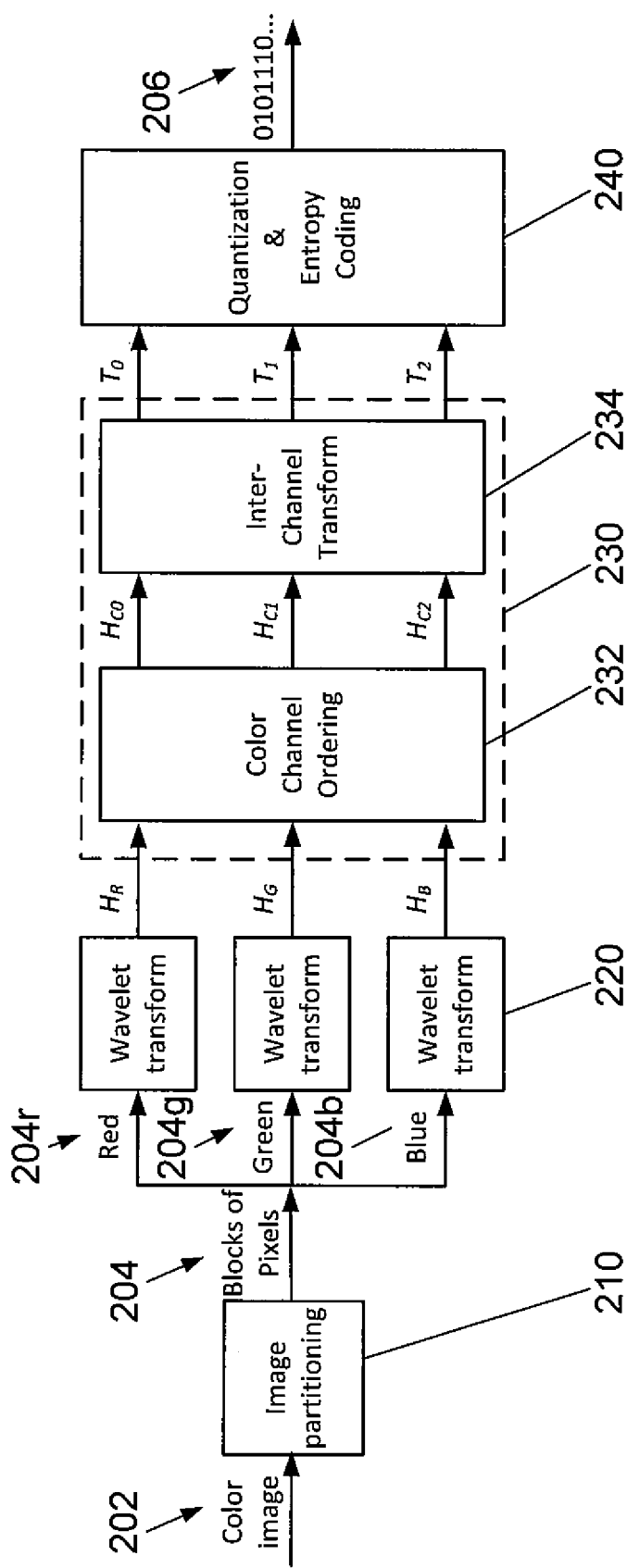
FIG. 2 is a block diagram illustrating a system for compressing a digital color bitmap image in accordance with one embodiment of the present invention.
Figure 3:
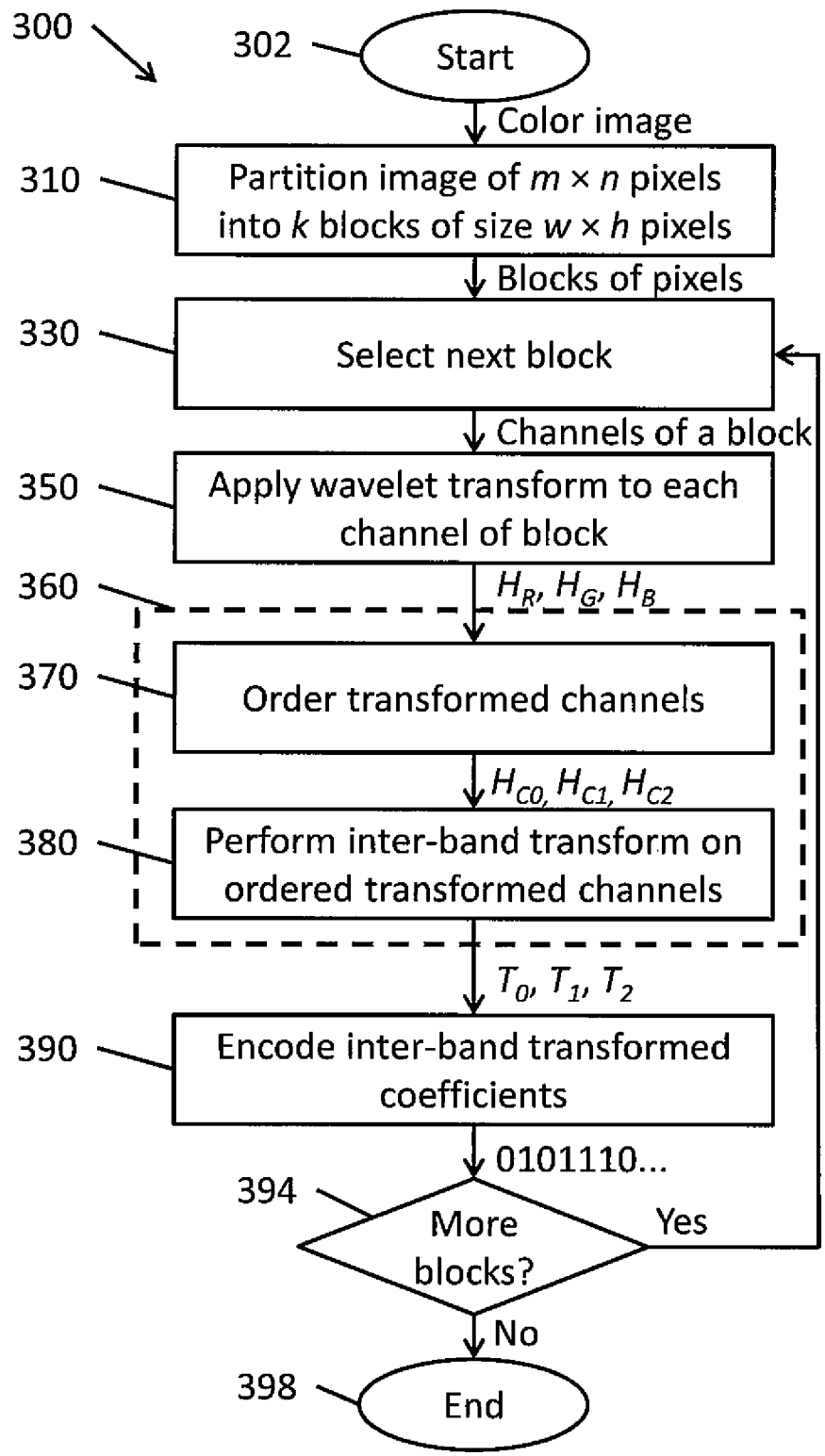
FIG. 3 is a flowchart illustrating a method for compressing a digital color bitmap image in accordance with one embodiment of the present invention.

FIG. 2 is a block diagram illustrating a system for compressing a digital color bitmap image in accordance with one embodiment of the present invention. FIG. 3 is a flowchart illustrating a method for compressing a digital color bitmap image in accordance with one embodiment of the present invention.

In various embodiments of the present invention, components corresponding to the block diagram may be implemented as components of the GPU 50 or may be implemented as components of the processor 20. In addition, the operations may be performed by dedicated application specific hardware such as an application specific integrated processor (ASIC) or a field programmable gate array (FPGA) or may be performed by programmed general purpose processor such as a program running on a microprocessor (such as processor 20 of FIG. 1) or a program running on a graphics processing unit (such as GPU 50 of FIG. 1).

In one embodiment of the present invention, in operation 310 of FIG. 3, the image partitioning module 210 in the block diagram of FIG. 2 partitions an RGB color image 202 having resolution m pixels×n pixels (m×n) may be divided into k blocks 204, each of the blocks having dimensions of w pixels×h pixels (w×h) (e.g., blocks of 16 pixels by 16 pixels). The red, blue, and green channels 204r, 204g, and 204b of each of the blocks, selected in operation 330, is then transformed in operation 350 by a wavelet transform module 220 (e.g., a Haar transform) to generate transformed red, green, and blue channels $H_R$, $H_G$, and $H_B$, each of the transformed channels including a plurality of coefficients. The transformed channels $H_R$, $H_G$, and $H_B$ are supplied to an adaptive inter-channel transform (ICT) module 230.

The adaptive inter-channel transform module 230 includes a color channel ordering module 232 and an inter-channel transform module 234 to perform an inter-channel transform in operation 360. Operation 360 includes operation 370 and operation 380. In operation 370, the color channel ordering module compares the received transformed channels $H_R$, $H_G$, and $H_B$ and determines an order of the channels based on the resulting comparison. As a result, the transformed channels are mapped into channels $H_{C0}$, $H_{C1}$, and $H_{C2}$ (or first, second, and third channels, respectively). For example, if the inter-channel transform module 234 determines that the ordering of the channels in a particular block is <$H_G$, $H_R$, $H_B$>, then $H_R$=>$H_{C0}$, $H_G$=>$H_{C1}$, and $H_B$=>$H_{C2}$.

In operation 380, the ordered channels then supplied to the inter-channel transform module 234 as known in the art and as described in more detail below. The resulting inter-channel transformed coefficients $T_0$, $T_1$, and $T_2$ are supplied to the quantization and entropy encoding module 240, which, in operation 390, encodes the transformed channels into an output bit stream 206, which contains the compressed representation of the color image 202. If there are more blocks to process, then in operation 394, the process returns to operation 330 and another block is selected.

While the flowchart in FIG. 3 illustrates a method in which the blocks are sequentially selected and transformed, in some embodiments of the present invention multiple blocks may be processed in parallel (e.g., using a multi-core processor or using multiple parallel hardware pipelines).

Figure 4:
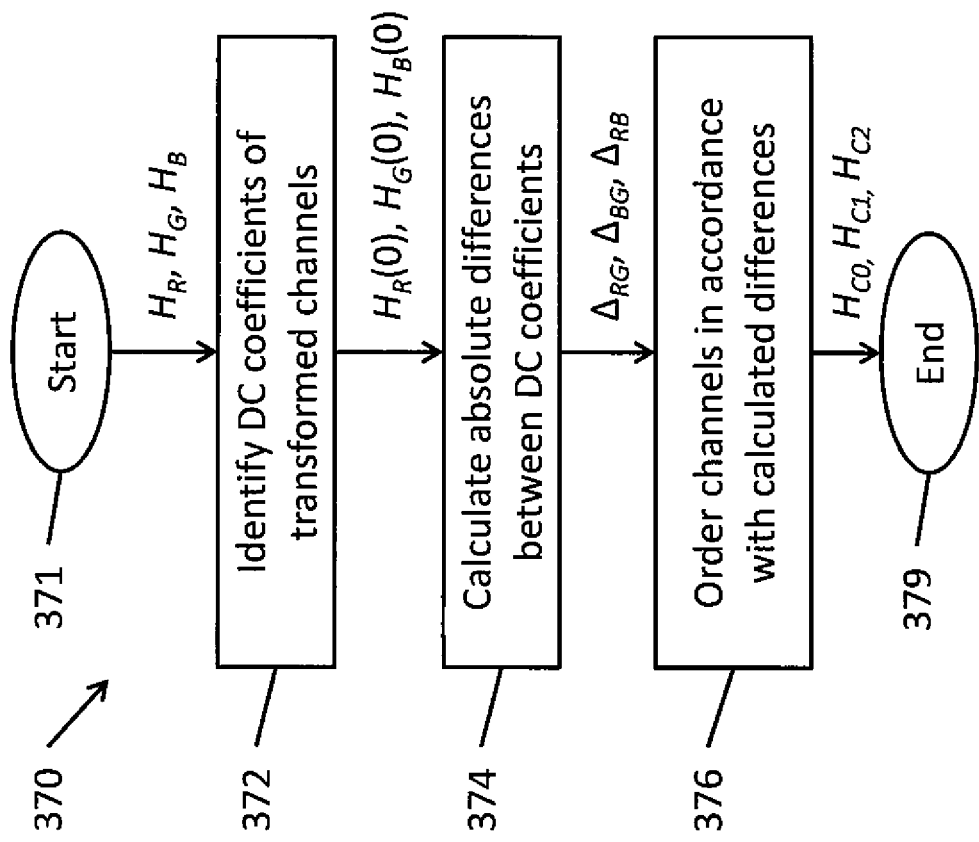
FIG. 4 is a flowchart illustrating a method for ordering a plurality of channels according to one embodiment of the present invention.

FIG. 4 is a flowchart illustrating a method for ordering a plurality of channels according to one embodiment of the present invention. According to one embodiment of the present invention, the order of the channels is determined by evaluating the DC values of the wavelet transform coefficients of the each channel of the block (e.g., the DC coefficients after applying the Haar wavelet transformation), which represent the overall or average color intensity of the block. For notational purposes, if $H_R(n)$, $H_G(n)$, and $H_B(n)$ (where n=0, 1, 2, . . . ) represent the n-th coefficient of the transformed channel, then, in operation 372, $H_R(0)$, $H_G(0)$, and $H_B(0)$ respectively stand for the zeroth (or DC) coefficient of the red, green, and blue channels.

In operation 374, the channel ordering module 232 calculates absolute differences $\Delta_{RG}$, $\Delta_{BG}$, and $\Delta_{RB}$ between the DC coefficients of the channels:

$$\Delta_{RG}=|H_R(0)-H_G(0)|$$

$$\Delta_{BG}=|H_B(0)-H_G(0)|$$

$$\Delta_{RB}=|H_R(0)-H_B(0)|$$

In operation 376, the three calculated difference values $\Delta_{RG}$, $\Delta_{BG}$, and $\Delta_{RB}$ are used to determine the ordering of the red, green, and blue channels $H_R$, $H_G$, and $H_B$ or the mapping of the red, green, and blue channels $H_R$, $H_G$, and $H_B$ to the ordered channels $H_{C0}$, $H_{C1}$, and $H_{C2}$.

Figure 5:
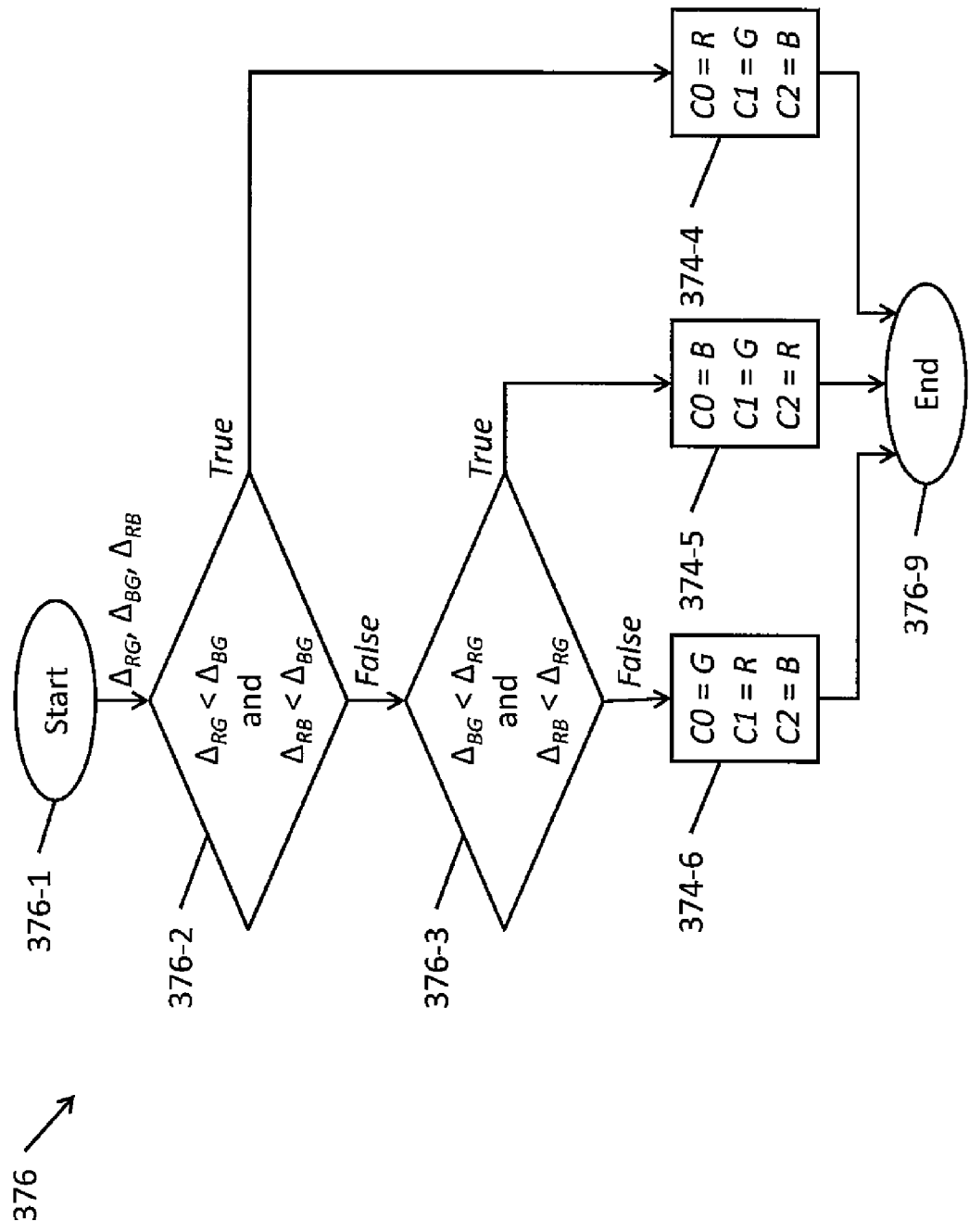
FIG. 5 is a flowchart illustrating a method for determining an order of a plurality of channels according to one embodiment of the present invention.

FIG. 5 is a flowchart illustrating a method for determining an order of a plurality of channels according to one embodiment of the present invention. Referring to FIG. 5, the differences values calculated in operation 374 are compared in operation 376-2. In particular, if:

$$\Delta_{RG}<\Delta_{BG} \text{ and } \Delta_{RB}<\Delta_{BG}$$

then the ordering is set in operation 374-4 to be: C0=R, C1=G, and C2=B (in other words, $H_{C0}=H_R$, $H_{C1}=H_G$, and $H_{C2}=H_B$ or <$H_R$, $H_G$, $H_B$>).

If the conditions tested for in operation 376-2 are false, then a different set of conditions are tested for in operation 376-3. In particular, if:

$$\Delta_{BG}<\Delta_{RG} \text{ and } \Delta_{RB}<\Delta_{RG}$$

then the ordering is set in operation 374-5 to be C0=B, C1=G, and C2=R (in other words, $H_{C0}=H_B$, $H_{C1}=H_G$, and $H_{C2}=H_R$ or <$H_B$, $H_G$, $H_R$>).

If the conditions tested for in operation 376-3 are false, then the ordering is set in operation 374-6 to be C0=G, C1=R, and C2=B (in other words, $H_{C0}=H_G$, $H_{C1}=H_R$, and $H_{C2}=H_B$ or <$H_G$, $H_R$, $H_B$>).

Table 1, below, provides a pseudocode implementation of the above-described method:

TABLE 1

```
IF ((Δ_RG < Δ_BG) && (Δ_RB < Δ_BG))
    C0 = R; C1 = G; C2 = B;
ELSE IF ((Δ_BG < Δ_RG) && (Δ_RB < Δ_RG))
    C0 = B; C1 = G; C2 = R;
ELSE
    C0 = G; C1 = R; C2 = B;
END
```

The resulting mapping or ordering is output to the next stage of the computation (e.g., to the inter-channel transform module 234).

Figure 6:
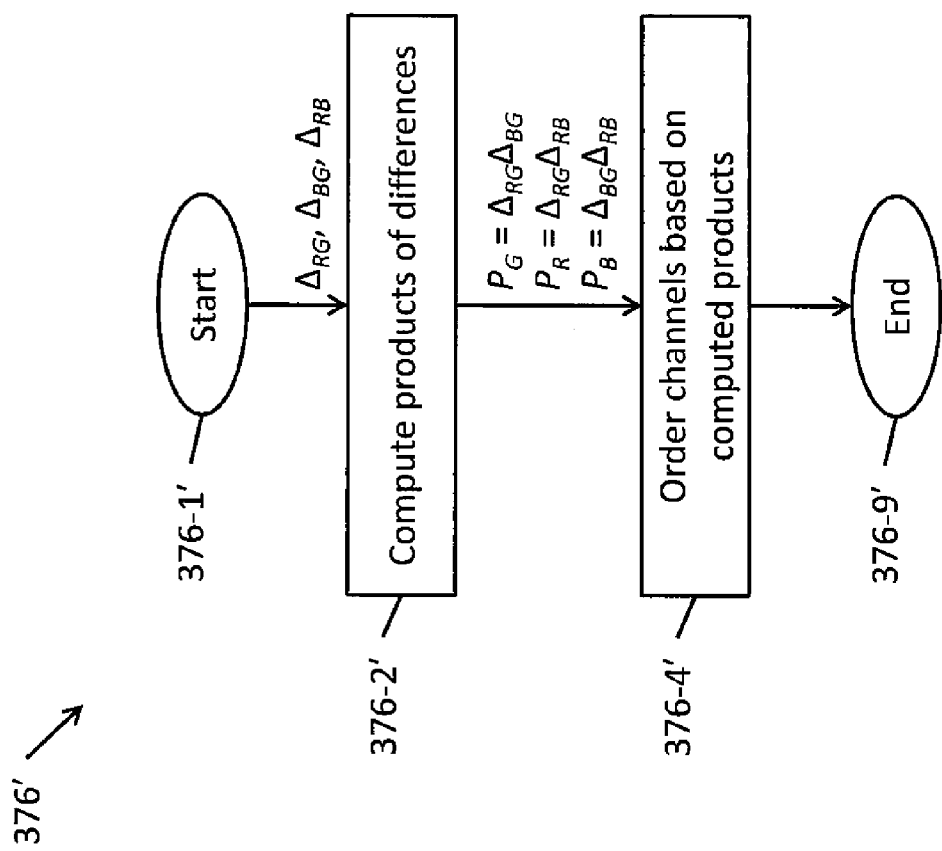
FIG. 6 is a flowchart illustrating a method for determining an order of a plurality of channels according to another embodiment of the present invention.

FIG. 6 is a flowchart illustrating a method 376' for determining an order of a plurality of channels according to another embodiment of the present invention. Referring to FIG. 6, in one embodiment of the present invention, in operation 376-2', the color channel ordering module 232 multiplies pairs of computed differences to generate a plurality of products, one product for each channel:

$$P_G=\Delta_{RG}\Delta_{BG}$$

$$P_R=\Delta_{RG}\Delta_{RB}$$

$$P_B=\Delta_{BG}\Delta_{RB}$$

In operation 376-4', the color channel ordering module 232 orders the channels in from smallest product to largest product. In other words:

$$C0=\mathrm{argmin}_{\{R,G,B\}} \{P_G,P_R,P_B\}$$

$$C2=\mathrm{argmin}_{\{R,G,B\}} \{P_G,P_R,P_B\}$$

For example, if $P_R<P_B<P_G$, then the color channel ordering module 232 would output the order <R, B, G> or <$H_R$, $H_B$, $H_G$> or $H_{C0}=H_R$, $H_{C1}=H_B$, and $H_{C2}=H_G$.

Figure 7A:
FIG. 7A is an example of a color image to be analyzed according to one embodiment of the present invention.
Figure 7B:
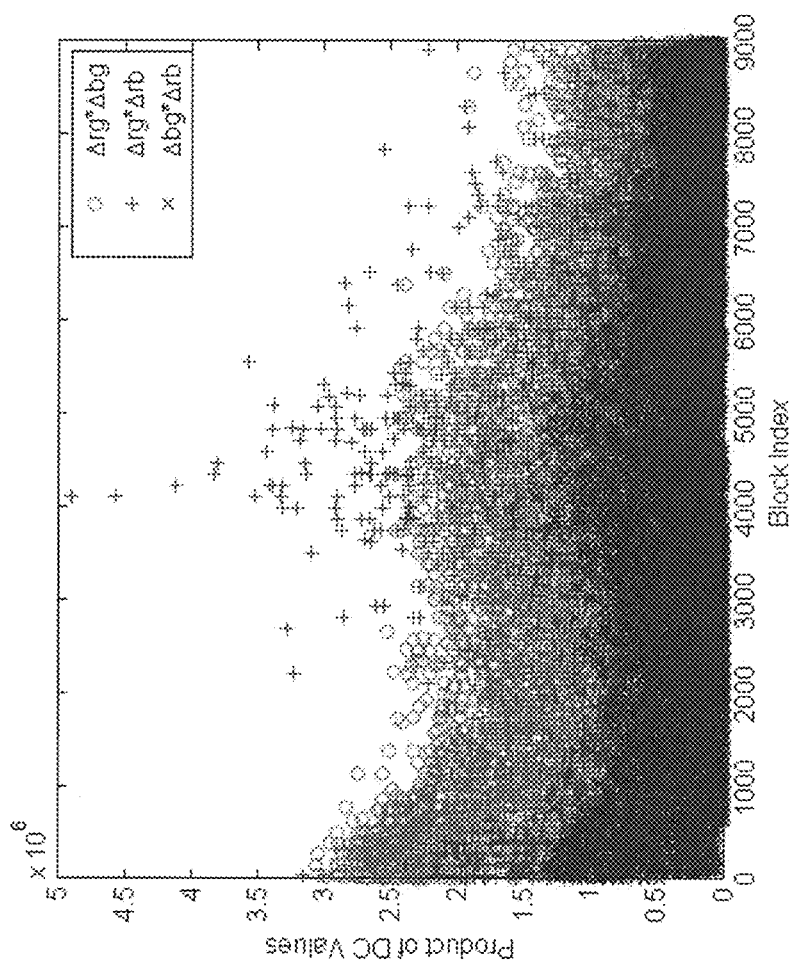
FIG. 7B is a graph illustrating the products of the DC coefficients for each of the channels of the image shown in FIG. 7A as analyzed according to one embodiment of the present invention.

FIG. 7A is an example of a color image to be analyzed according to one embodiment of the present invention. FIG. 7B is a graph illustrating the products of the DC coefficients for each of the channels of the image shown in FIG. 7A as analyzed according to one embodiment of the present invention. As seen in FIG. 7B, for most of the blocks in the image, the blue channel has the smallest magnitude, followed by the red transform, then the green transform. Therefore, for most of the blocks, the color channel ordering module 232 would output the blue channel as C0, the red channel as C1, and the green channel as C2. On the other hand, in this example, in some blocks (e.g., some of the blocks around block index 4000 to 5000), the red channel has a greater magnitude than the green channel. For those blocks, the color channel ordering module 232 would output the blue channel as C0, the green channel as C1, and the red channel as C2.

Figure 8:
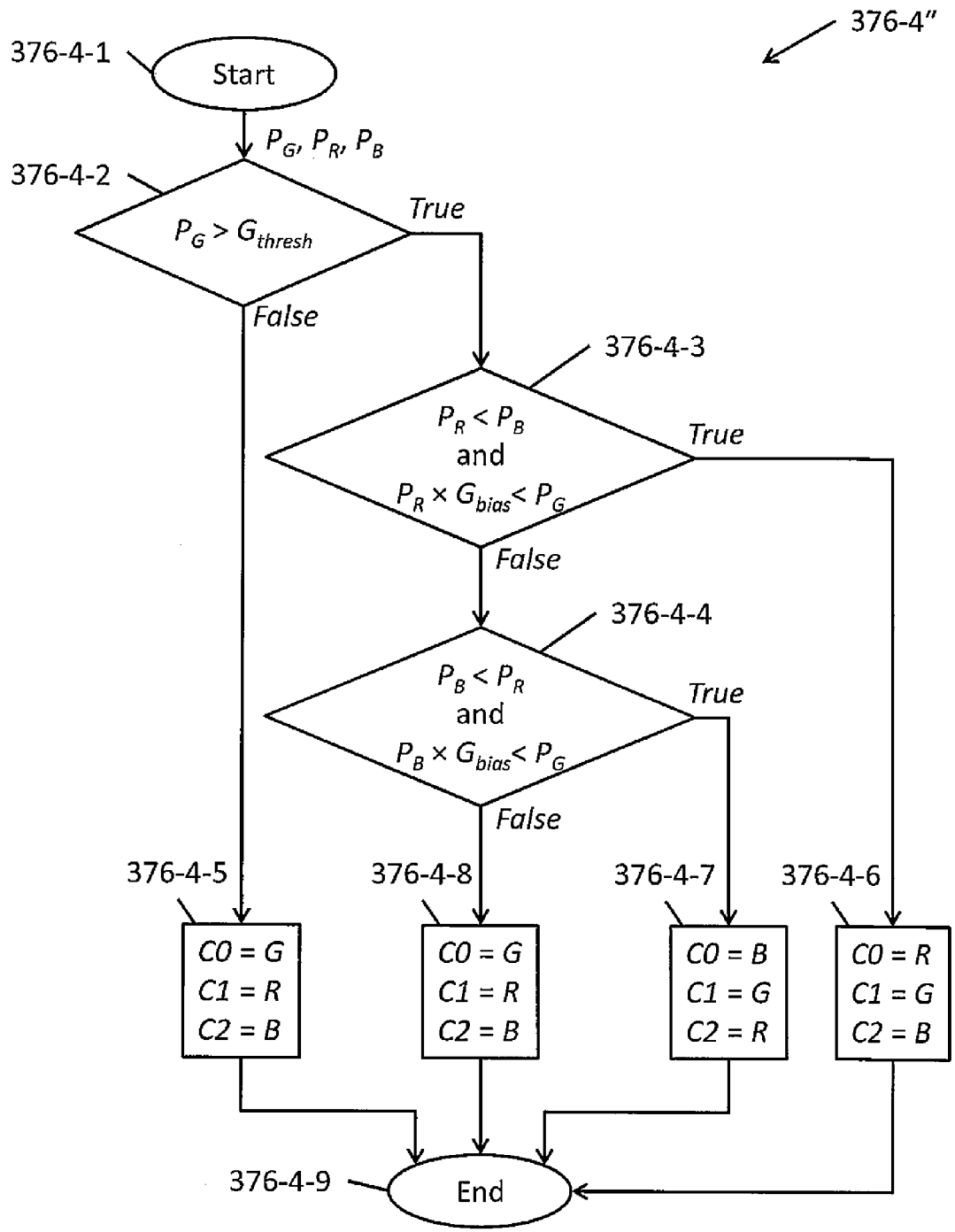
FIG. 8 is a flowchart illustrating a method of determining an ordering of the channels using a green bias.

In some embodiments of the present invention, a bias is given to the green channel because green generally contains the most texture details close to luminance and because it is the most important part of the spectrum due to the physiology of the human visualization system. FIG. 8 is a flowchart illustrating a method of determining an ordering of the channels using a green bias.

According to one embodiment of the present invention, a green threshold ($G_{thresh}$) parameter and a green bias ($G_{bias}$) parameter are used to adjust the ordering.

In more detail, in operation 376-4-2, the color channel ordering module 232 determines if $$P_G>G_{thresh}$$

If not, then in operation 376-4-5, it sets the output to C0=G, C1=R, and C2=B (in other words, $H_{C0}=H_G$, $H_{C1}=H_R$, and $H_{C2}=H_B$ or $<H_G, H_R, H_B>$). If $P_G$ is greater than $G_{thresh}$, then in operation 376-4-3, the color channel ordering module 232 determines if $$P_R<P_B \text{ and } P_R \times G_{bias}<P_G$$

If so, then, in operation 376-4-6, the order of the channels is set to C0=R, C1=G, and C2=B (in other words, $H_{C0}=H_R$, $H_{C1}=H_G$, and $H_{C2}=H_B$ or $<H_R, H_G, H_B>$). If not, then in operation 376-4-4, the color channel ordering module 232 determines if $$P_B<P_R \text{ and } P_B \times G_{bias}<P_G$$

If so, then in operation 376-4-7 it sets the output to be C0=B, C1=G, and C2=R (in other words, $H_{C0}=H_B$, $H_{C1}=H_G$, and $H_{C2}=H_R$ or $<H_B, H_G, H_R>$). If not, then it sets the output to be C0=G, C1=R, and C2=B (in other words, $H_{C0}=H_G$, $H_{C1}=H_R$, and $H_{C2}=H_B$ or $<H_G, H_R, H_B>$).

Table 2, below, provides a pseudocode implementation of the above described green-biased method of ordering channels according to one embodiment of the present invention:

TABLE 2

```
IF (P_G > G_thresh)
    IF ((P_R < P_B) && (P_R × G_bias < P_G))
        C0 = R; C1 = G; C2 = B;
    ELSE IF ((P_B < P_R) && (P_B × G_bias < P_G))
        C0 = B; C1 = G; C2 = R;
    ELSE
        C0 = G; C1 = R; C2 = B;
    END
ELSE
    C0 = G; C1 = R; C2 = B;
END
```

In one embodiment, for a 16 pixel by 16 pixel block, $G_{thresh}=12800$ and $G_{bias}=1.25$.

After determining the order of the channels, the inter-channel transform module 234 performs an inter-channel transform in operation 380 on all of the AC coefficients (e.g., H(n) for n>0, in other words, all of the coefficients other than the DC coefficient) of all the channels. For example, in one embodiment, the encoder can encode the coefficients of the ordered channels $H_{C0}$, $H_{C1}$, and $H_{C2}$ to generate transformed channels $T_0$, $T_1$, and $T_2$ as follows:

$$T_2(n)=H_{C1}(n)-H_{C2}(n)$$

$$t=H_{C2}(n)+\lfloor T_2(n)>>1 \rfloor$$

$$T_1(n)=H_{C0}(n)-t$$

$$T_0(n)=t+\lfloor T_1(n)>>1 \rfloor, \text{ for } n=1, 2, 3, \ldots, N$$

The transformed coefficients $T_0$, $T_1$, and $T_2$ are then encoded by following stages of the encoding process and converted and modulated into signals to be transferred or stored.

In one embodiment, at a decoder end, the reverse (or inverse) transform can be performed to recover the ordered channels $H_{C0}$, $H_{C1}$, and $H_{C2}$ from the transformed channels $T_0$, $T_1$, and $T_2$ as follows:

$$t=T_0(n)-\lfloor T_1(n)>>1 \rfloor$$

$$H_{C0}(n)=T_1(n)+t$$

$$H_{C2}(n)=t-\lfloor T_2(n)>>1 \rfloor$$

$$H_{C1}(n)=H_{C2}(n)+T_2(n), \text{ for } n=1,2,3,\ldots,N$$

Figure 9:
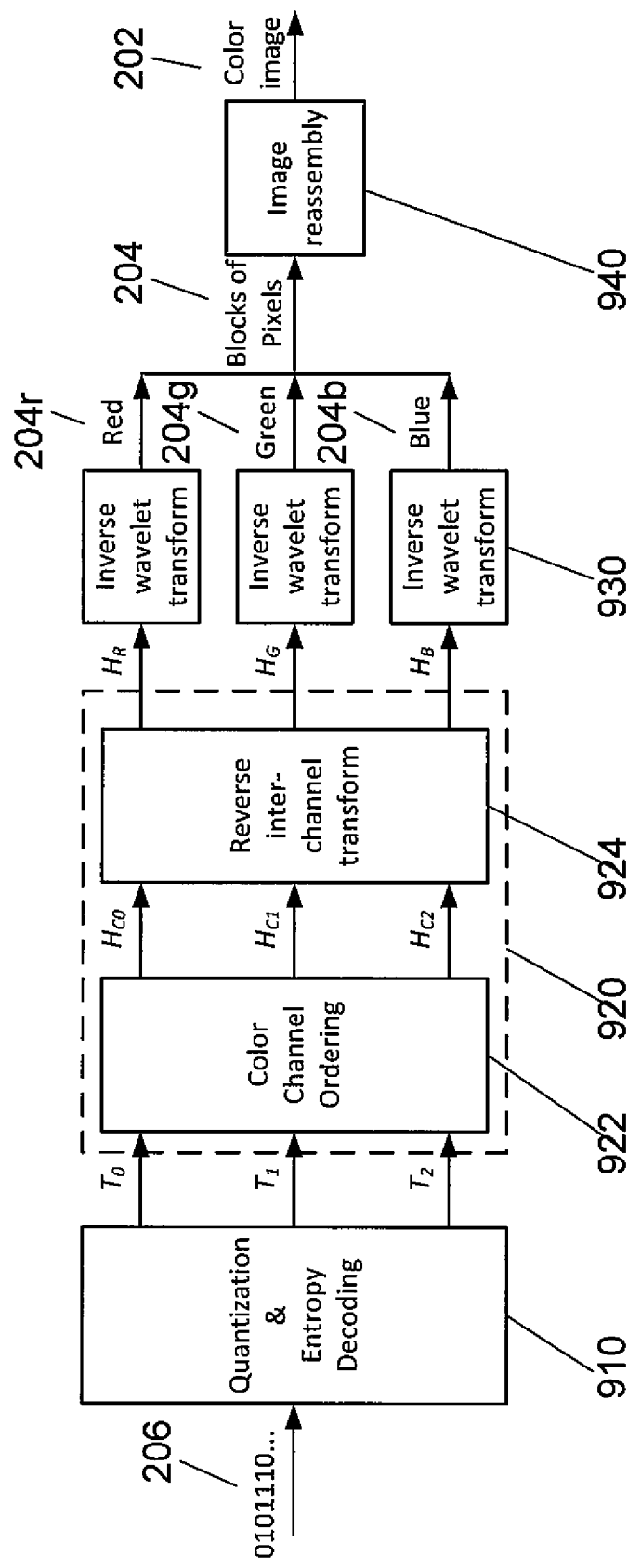
FIG. 9 is a block diagram illustrating a receiver according to one embodiment of the present invention.

FIG. 9 is a block diagram illustrating a receiver according to one embodiment of the present invention. Referring to FIG. 9, a bit stream 206 is received and decoded by a decoder 910 to obtain decoded first, second, and third inter-channel transformed channels $T_0$, $T_1$, and $T_2$. In one embodiments of the present invention, the ordering of the channels on a per-block basis is explicitly encoded in the bit stream.

In other embodiments of the present invention, the coefficients of the first, second, and third inter-channel transformed channels are used to derive the ordering of the channels used during the encoding process. For example, the color channel ordering module 922 can supply the zeroth coefficients of the transformed channels $T_0$, $T_1$, and $T_2$ to the same channel ordering methods described above with respect to FIGS. 5, 6, and 8 to determine the order of the channels used by the encoder.

The ordered channels $H_{C0}$, $H_{C1}$, and $H_{C2}$ are supplied to a reverse (or inverse) inter-channel transform module 924 as described, for example, in the pseudo code above and the reverse (or inverse) inter-channel transform module 924 outputs the frequency space wavelet transformed channels $H_R$, $H_G$, and $H_B$. These wavelet transformed channels are supplied to inverse wavelet transform modules 930, which output the red, green, and blue bitmap channels, which are reassembled into blocks of pixels 204 which are, in turn, reassembled by the image reassembly module 940 to reconstruct the color image 202.

In one embodiment, the DC coefficients of each of the transformed channels are transmitted first, thereby allowing the receiver (or decoder) to derive the ordering of the channels by performing the same operations performed by the color channel ordering module 232 as described above, for example, with respect to FIGS. 5, 6, and 8.

Because the inter-channel transform merely uses addition (+ and −) and shifting (>>) operations, it is fast to compute and easy to accelerate using hardware operations. Embodiments of the present invention are performed on a block-by-block basis and do not assume a fixed mapping of color channels across the entire image. Instead, the ordering of color channels (e.g., the mapping of color channels {R, G, B} to ordered channels of the transform {C0, C1, C2} may vary from one block to another.

The adaptive inter-channel transform according to embodiments of the present invention can provide significant compression gain (>1 dB in peak signal-to-noise ratio) for certain types of images with nearly no additional computation, while maintaining the same compression performance on other types of images. For a set of six sample images (including the image shown in FIG. 7A), a 1.2 dB gain (39.22 dB vs 37.90 dB) was observed for the image while the same compression performance was maintained for the rest of the test images. The compression gain is attributed to using the blue channel as the base channel for most of the blocks in the inter-channel transform as opposed to the red or green channel (see FIG. 7B). Hence, by applying the adaptive inter-channel transform, further reduction of color correlation is achieved.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for compressing an image comprising one or more blocks, each of the one or more blocks comprising an x channel, a y channel, and a z channel, the method comprising, for each of the one or more blocks:
  performing a frequency domain transform, by a processor, on each of the x, y, and z channels;
  ordering, by the processor, the transformed x, y, and z channels into first, second, and third transformed channels, the ordering comprising:
    computing three differences between the transformed x, y, and z channels ($H_x$, $H_y$, and $H_z$), the three differences comprising:
      an xy difference between the transformed x channel and the transformed y channel, the xy difference being $|H_x(0)-H_y(0)|$;
      an xz difference between the transformed x channel and the transformed z channel, the xz difference being $|H_x(0)-H_z(0)|$; and
      a yz difference between the transformed y channel and the transformed z channel, the yz difference being $|H_y(0)-H_z(0)|$; and
    determining the ordering of the three transformed channels in accordance with the three differences;
  performing an inter-channel transform in accordance with the order of the first transformed channel, the second transformed channel, and the third transformed channel; and
  encoding the inter-channel transformed channels.

2. The method of claim 1, wherein the determining of the ordering of the three transformed channels comprises:
  when the xy difference is less than the yz difference and the xz difference is less than the yz difference, then ordering the x channel as the first channel, the y channel as the second channel, and the z channel as the third channel,
  when the yz difference is less than the xy difference and the xz difference is less than the xy difference, then ordering the z channel as the first channel, the y channel as the second channel, and the x channel as the third channel, and
  otherwise, ordering the y channel as the first channel, the x channel as the second channel, and the z channel as the third channel.

3. The method of claim 1, wherein the determining of the ordering of the three transformed channels comprises:
  computing an x product of the xy difference and the xz difference;
  computing a y product of the xy difference and the yz difference; and
  computing a z product of the xz difference and the yz difference, and
  wherein the first channel is the channel corresponding to the smallest of the x product, the y product, and the z product.

4. The method of claim 1, wherein the determining of the ordering of the three transformed channels comprises:
  computing an x product of the xy difference and the xz difference;
  computing a y product of the xy difference and the yz difference; and
  computing a z product of the xz difference and the yz difference,
  wherein the x channel represents a red channel and the x product represents a red product,
  wherein the y channel represents a green channel and the y product represents a green product,
  wherein the z channel represents a blue channel and the z product represents a blue product,
  wherein, when the green product is greater than a green threshold,
    when the red product is less than the blue product and the red product multiplied by a green bias is less than the green product, the first channel is the red channel, the second channel is the green channel, and the third channel is the blue channel,
    when the blue product is less than the red product and the blue product multiplied by the green bias is less than the green product, the first channel is the blue channel, the second channel is the green channel, and the third channel is the red channel, and
    otherwise, the first channel is the green channel, the second channel is the red channel, and the third channel is the blue channel, and
  wherein, when the green channel is less than or equal to the green threshold, the first channel is the green channel, the second channel is the red channel, and the third channel is the blue channel.

5. The method of claim 4, wherein the green bias is at least 1.25.

6. The method of claim 1, wherein:
  the xy difference is calculated by computing the absolute value of the difference between a zeroth coefficient of the transformed x channel and a zeroth coefficient of the transformed y channel;
  the xz difference is calculated by computing the absolute value of the difference between the zeroth coefficient of the transformed x channel and a zeroth coefficient of the transformed z channel; and
  the yz difference is calculated by computing the absolute value of the difference between the zeroth coefficient of the transformed y channel and the zeroth coefficient of the transformed z channel.

7. The method of claim 1, wherein the x channel represents a red color,
  wherein the y channel represents a green color, and
  wherein the z channel represents a blue color.

8. The method of claim 1, wherein the performing of the frequency domain transform of each of the x, y, and z channels comprises performing a wavelet transform on each of the channels.

9. The method of claim 8, wherein the wavelet transform is a Haar transform.

10. The method of claim 1, wherein the image comprises at least two blocks, wherein the three channels are ordered in a first order in a first block of the blocks and ordered in a second order is a second block of the blocks, the first order being different from the second order.

11. An image processing device comprising:
  an image partitioning module to partition a color image into a plurality of blocks of pixels, each of the blocks comprising a plurality of channels, the channels comprising an x channel, a y channel, and a z channel;
  a wavelet transform module to transform the x, y, and z channels of a block of the blocks into a frequency domain;
  a color channel ordering module to determine an ordering of the transformed x, y, and z channels of the block into first, second, and third transformed channels by:
    computing three differences between the transformed x, y, and z channels ($H_x$, $H_y$, and $H_z$), the plurality of differences comprising:
      an xy difference between the transformed x channel and the transformed y channel, the xy difference being $|H_x(0)-H_y(0)|$;
      an xz difference between the transformed x channel and the transformed z channel, the xz difference being $|H_x(0)-H_z(0)|$; and a yz difference between the transformed y channel and the transformed z channel, the yz difference being $|H_y(0)-H_z(0)|$; and determining the ordering of the three transformed channels in accordance with the three differences;

an inter-channel transform module to transform the ordered channels; and a quantization and entropy coding module to encode the inter-channel transformed channels.

12. The device of claim 11, wherein, when the xy difference is less than the yz difference and the xz difference is less than the yz difference, then the channel ordering module outputs the x channel as the first channel, the y channel as the second channel, and the z channel as the third channel, wherein, when the yz difference is less than the xy difference and the xz difference is less than the xy difference, then the channel ordering module outputs the z channel as the first channel, the y channel as the second channel, and the x channel as the third channel, and otherwise, the channel ordering module outputs the y channel as the first channel, the x channel as the second channel, and the z channel as the third channel.

13. The device of claim 11, wherein the channel ordering module is to:

compute an x product of the xy difference and the xz difference;

compute a y product of the xy difference and the yz difference;

compute a z product of the xz difference and the yz difference; and wherein the first channel is the channel corresponding to the smallest of the x product, the y product, and the z product.

14. The device of claim 11, wherein the channel ordering module is to:

compute an x product of the xy difference and the xz difference;

compute a y product of the xy difference and the yz difference; and compute a z product of the xz difference and the yz difference, wherein the x channel represents a red channel and the x product represents a red product, wherein the y channel represents a green channel and the y product represents a green product, wherein the z channel represents a blue channel and the z product represents a blue product, wherein:

when the green product is greater than a green threshold, when the red product is less than the blue product and the red product multiplied by a green bias is less than the green product, the channel ordering module outputs the red channel as the first channel, the green channel as the second channel, and the blue channel as the third channel, when the blue product is less than the red product and the blue product multiplied by the green bias is less than the green product, the channel ordering module outputs the blue channel as the first channel, the green channel as the second channel, and the red channel as the third channel, and otherwise, the channel ordering module outputs the green channel as the first channel, the red channel as the second channel, and the blue channel as the third channel, and when the green channel is less than or equal to the green threshold, the channel ordering module outputs the green channel as the first channel, the red channel as the second channel, and the blue channel as the third channel.

15. The device of claim 14, wherein the green bias is at least 1.25.

16. The device of claim 11, wherein:

the channel ordering module is to calculate the xy difference by computing the absolute value of the difference between a zeroth coefficient of the transformed x channel and a zeroth coefficient of the transformed y channel;

the channel ordering module is to calculate the xz difference by computing the absolute value of the difference between the zeroth coefficient of the transformed x channel and a zeroth coefficient of the transformed z channel; and the channel ordering module is to calculate the yz difference by computing the absolute value of the difference between the zeroth coefficient of the transformed y channel and the zeroth coefficient of the transformed z channel.

17. The device of claim 11, wherein the wavelet transform module is to transform the x, y, and z channels of the block utilizing a Haar transform.

18. The device of claim 11, wherein the color channel ordering module is to order the channels of a first block of the blocks into a first order and orders the channels of a second block of the block in a second order, the first order being different from the second order.

19. The method of claim 1, wherein the determining the ordering of the three transformed channel is performed in accordance with only the three differences.

20. The device of claim 11, wherein the determining the ordering of the three transformed channel is performed in accordance with only the three differences.

* * * * *